US010191346B2

United States Patent
Tang (10) Patent No.: US 10,191,346 B2
(45) Date of Patent: Jan. 29, 2019

(54) BLUE PHASE LIQUID CRYSTAL MODULES, BLUE PHASE LIQUID CRYSTAL DEVICES, AND THE MANUFACTURING METHOD THEREOF

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 512 days.

(21) Appl. No.: 14/892,471

(22) PCT Filed: Sep. 21, 2015

(86) PCT No.: PCT/CN2015/090104
§ 371 (c)(1),
(2) Date: Nov. 19, 2015

(87) PCT Pub. No.: WO2017/035878
PCT Pub. Date: Mar. 9, 2017

(65) Prior Publication Data
US 2017/0192260 A1 Jul. 6, 2017

(30) Foreign Application Priority Data

Aug. 28, 2015 (CN) .......................... 2015 1 0545600

(51) Int. Cl.
G02F 1/1343 (2006.01)
G02F 1/137 (2006.01)
(Continued)

(52) U.S. Cl.
CPC ............ *G02F 1/137* (2013.01); *G02F 1/1333* (2013.01); *G02F 1/1336* (2013.01); *G02F 1/134309* (2013.01); *G02F 1/133345* (2013.01); *G02F 1/134363* (2013.01); *G02F 2001/13793* (2013.01); *G02F 2001/133354* (2013.01); *G02F 2001/133622* (2013.01); *G02F 2001/133624* (2013.01); *G02F 2201/122* (2013.01);
(Continued)

(58) Field of Classification Search
CPC ......... G02F 1/133555; G02F 1/134363; G02F 2001/13793
See application file for complete search history.

(56) References Cited

U.S. PATENT DOCUMENTS

2009/0122211 A1* 5/2009 Mori .................. G02F 1/133555
349/42
2012/0280236 A1* 11/2012 Kim .................. G02F 1/134363
257/59

* cited by examiner

*Primary Examiner* — Thanh-Nhan P Nguyen
(74) *Attorney, Agent, or Firm* — Andrew C. Cheng (57) ABSTRACT

A blue phase liquid crystal module, a blue phase LCD and the manufacturing are disclosed. The blue phase liquid crystal module includes an up substrate; a down substrate opposite to the up substrate; and blue phase liquid crystals between the up substrate and the down substrate. The down substrate includes at least one wave-shaped insulation layer being arranged with respect to the up substrate and the down substrate. The reflective layer is arranged in a portion of the down substrate. Pixel electrodes and common electrodes are arranged alternately at valleys and at peaks of the wave-shaped insulation layer, and the blue phase liquid crystals are driven by at least one slant electrical field generated between the pixel electrode and the common electrode.

14 Claims, 8 Drawing Sheets

(51) Int. Cl.
  *G02F 1/1333* (2006.01)
  *G02F 1/13357* (2006.01)
  *G02F 1/1335* (2006.01)
(52) U.S. Cl.
  CPC .. *G02F 2201/123* (2013.01); *G02F 2201/128* (2013.01); *G02F 2203/09* (2013.01); *G02F 2203/30* (2013.01)

BLUE PHASE LIQUID CRYSTAL MODULES, BLUE PHASE LIQUID CRYSTAL DEVICES, AND THE MANUFACTURING METHOD THEREOF

BACKGROUND OF THE INVENTION

1. Field of the Invention

The present disclosure relates to liquid crystal display technology, and more particularly to a blue phase liquid crystal module, a blue phase liquid crystal device (LCD) and the manufacturing method thereof.

2. Discussion of the Related Art

Compared to the liquid crystal materials widely adopted for liquid crystal display, the blue phase liquid crystals are characterized by the attributes below. First, the response time of the blue phase liquid crystal is within sub-millisecond, and may be driven in a high speed, such as 240 Hz without adopting the Over Drive technology. As such, the moving image is prevented from being blurred. When the RGB LED is adopted as the backlight source, the color filter is not needed. The blue phase liquid crystal panels may achieve the field sequential color timing display. Second, orientation layer is not needed for the blue phase liquid crystals. This not only simplifies the manufacturing process, but also reduces the cost. Third, the blue phase liquid crystal device owns a wide viewing angle and a better dark state due to its optical isotropy. Fourth, the impact of the thickness of the liquid crystal cell toward the transmission rate may be ignored if the thickness of the blue phase liquid crystal cell exceed the transmission depth of the electrical field. This attribute is feasible for the large display or single plate LCD.

However, the large driving voltage has been a key issue for the blue phase liquid crystals. Usually, the feasible solution is to enhance the performance of the blue phase liquid crystal materials or to enhance the electrode structure. The first method may, for instance, relate to manufacturing the blue phase liquid crystals of large Kerr constant, which may be a complicated process of integrating the blue phase liquid crystal materials, wherein various factors, i.e., monomer, photoinitiator, and integrating conditions, have to be considered. Thus, the development cost is really high. With respect to the solution of enhancing the electrode structure, as the IPS structure is adopted, the transmission depth of the lateral electrical field generated by the horizontal electrode is limited, and a large driving voltage is needed. Thus, the blue phase liquid crystal technology adopting the IPS driving method has to be enhanced.

Currently, the blue phase liquid crystal panel cannot adopt a vertical electrical field for the reason below. When the liquid crystal panel applies the voltage, the vertical electrical field formed by the pixel electrode on the array substrate and the common electrode on the opposite substrate may pull and extract the blue phase liquid crystals along the vertical direction. After passing through the blue phase liquid crystals, the phase of the polarized lights has not changed. The polarized state of the polarized lights after passing through the blue phase liquid crystals is the same when the blue phase liquid crystal panel has not been applied with the voltage. As the absorbing axis of the up and down polarizer of the liquid crystal panel are vertical to each other, the lights emitted from the backlight source cannot pass through the liquid crystal panel, and thus the light state of the liquid crystal panel cannot be obtained. Thus, the grayscale of the blue phase liquid crystal panel may not be displayed by only configuring the vertical electrical field.

SUMMARY

The object of the invention is to provide a blue phase liquid crystal molecules, a blue phase LCD and the manufacturing method thereof to solve the large driving voltage issue. In addition, the configuration may overcome the issue of not being able to obtain a bright state of the liquid crystal panel when the vertical electrical field is adopted.

In one aspect, the blue phase liquid crystal module includes an up substrate; a down substrate opposite to the up substrate; and blue phase liquid crystals between the up substrate and the down substrate. The down substrate includes at least one wave-shaped insulation layer being arranged with respect to the up substrate and the down substrate. The reflective layer is arranged in a portion of the down substrate. Pixel electrodes and common electrodes are arranged alternately at valleys and at peaks of the wave-shaped insulation layer, and the blue phase liquid crystals are driven by at least one slant electrical field generated between the pixel electrode and the common electrode.

In an embodiment, the insulation layer is of a saw-tooth-shaped structure, the common electrode is V-shaped and is arranged at the valley of the wave-shaped insulation layer, and the pixel electrode is inverse-V-shaped and is arranged at the peak of the wave-shaped insulation layer; or the common electrode is inverse-V-shaped and is in the peak of the wave-shaped insulation layer, and the pixel electrode is V-shaped and is arranged at the valley of the wave-shaped insulation layer.

In an embodiment, an included angle between a saw-tooth edge of the insulation layer within the transmission area and the down substrate is smaller than the included angle between the saw-tooth edge of the insulation layer within the reflective area and the down substrate.

In an embodiment, a height of the saw-tooth-shaped structure in the transmission area and the height of the saw-tooth-shaped insulation layer in the reflective area are different.

In an embodiment, a space between the insulation layer in the transmission area and the down substrate is of a hollow structure to receive the blue phase liquid crystals, and the space between the insulation layer in the reflective area and the down substrate is filled by solid and transparent materials.

In an embodiment, the gap between the common electrode and the pixel electrode in the transmission area is different from the gap between the common electrode and the pixel electrode in the reflective area, and the gap between the common electrode and the pixel electrode in the transmission area is smaller than the gap between the common electrode and the pixel electrode in the reflective area.

In an embodiment, wherein a gap between the pixel electrode and the common electrode is smaller than the gap between the pixel electrode and the common electrode in the reflective area.

In an embodiment, the blue phase liquid crystal module further comprises auxiliary mats between the up substrate and the down substrate, the pixel electrode and the common electrode are respectively embedded within the insulation layer or on a surface of the insulation layer, a distance between the peak of the wave-shaped insulation layer and the up substrate is D1, the distance between the auxiliary mats and the up substrate or the down substrate is D2, wherein D1 is larger than or equals to D2.

In another aspect, a blue phase LCD includes any one of the above blue phase liquid crystal modules.

In one aspect, a manufacturing method of blue phase liquid crystal modules includes: forming a reflective layer on a reflective area of a down substrate, and forming a photoresist layer on a transmission area and a reflective area of the down substrate; arranging a plurality of masks having parallel slots on the photoresist layer; radiating the photoresist within the transmission area and the reflective area by a plurality of unidirectional ultraviolet rays, the ultraviolet rays passing through the slots of the mask to radiate and soften a portion of the photoresist layer, striping the soften photoresist after the mask is removed to form wave-shaped photoresist surfaces having different gaps in the transmission area and the reflective area; forming a first insulation layer on the wave-shaped insulation layer; forming a transparent electrode layer on the first insulation layer; forming pixel electrodes and common electrodes by etching the transparent electrode layer; striping the photoresist below the first insulation layer; and filling in the blue phase liquid crystals and closing the up substrate.

Compared to the conventional technology, the blue phase liquid crystal module is configured with the hollow or solid insulation layer having the down substrate as the bottom. In addition, the V-shaped or inverse-V-shaped pixel electrode and common electrode may be embedded within the insulation layer. The blue phase liquid crystals are driven by the slant electrical field formed between the V-shaped and the inverse-V-shaped pixel electrode and the common electrode so as to reduce the driving voltage of the blue phase liquid crystal module. At the same time, the issue of not being able to obtain the bright state of the liquid crystal panel when the vertical electrical field is adopted may be solved. In addition, the reflective layer is arranged in a portion of the down substrate such that the down substrate is divided into the transmission area and the reflective area. The ripple of the insulation layers of the transmission area and the reflective area may include different angles and different height. The phase delay amount of the light beams passing through the transmission area is approximately twice as that of the light beams passing through the reflective area. In this way, the optical delay amount of the transmission area and the reflective area are the same.

DETAILED DESCRIPTION OF THE EMBODIMENTS

Embodiments of the invention will now be described more fully hereinafter with reference to the accompanying drawings, in which embodiments of the invention are shown.

Figure 1:
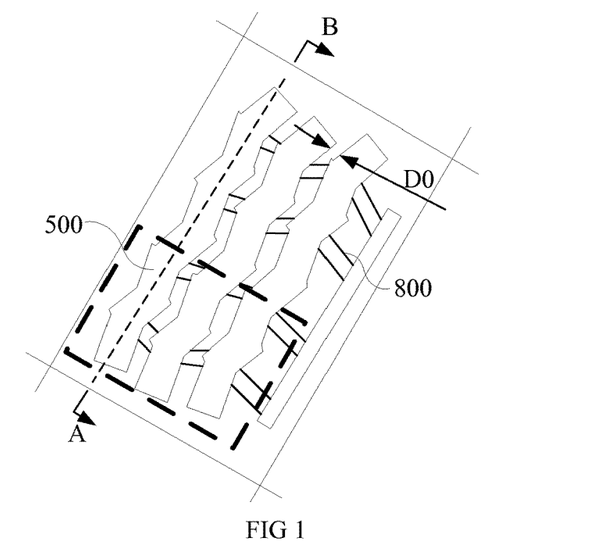
FIG. 1 is a schematic view of the blue phase liquid crystal module in accordance with one embodiment.
Figure 2:
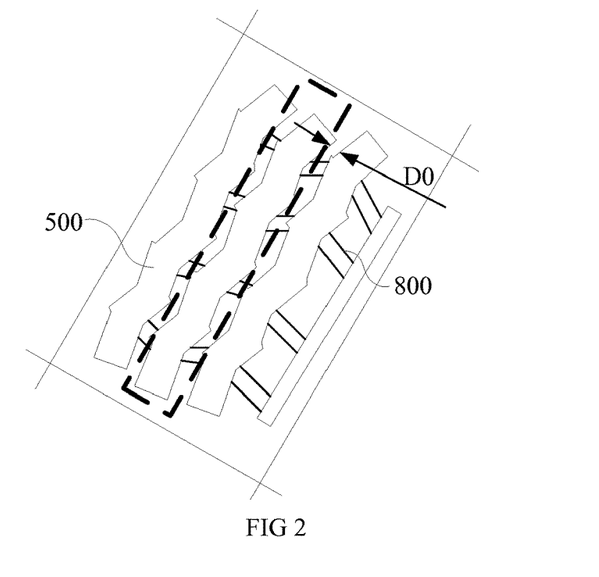
FIG. 2 is a schematic view of the blue phase liquid crystal module in accordance with another embodiment.

FIG. 1 is a schematic view of the blue phase liquid crystal module in accordance with one embodiment. FIG. 2 is a schematic view of the blue phase liquid crystal module in accordance with another embodiment. The blue phase liquid crystal module includes a transmission area and a reflective area, wherein the dashed lines of FIGS. 1 and 2 relate to the reflective areas, and other portions are transmission area. It can be understood that only two configurations of the transmission area and the reflective area are shown in FIGS. 1 and 2, and the transmission area and the reflective area may be configured in various ways, which are omitted hereinafter.

Figure 3:
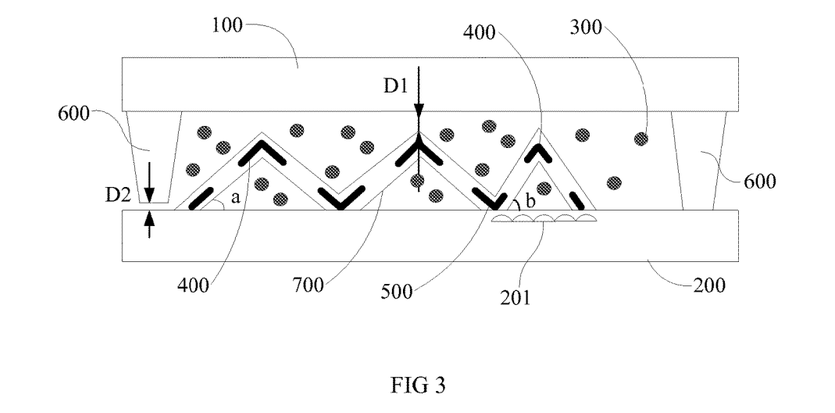
FIG. 3 is a cross-sectional view of the liquid crystal module in accordance with a first embodiment.

In the first embodiment, as shown in FIGS. 1 and 3, FIG. 3 is a cross-sectional view of the liquid crystal module in accordance with a first embodiment. The blue phase liquid crystal module may include, but not limited to, the following components: an up substrate 100, a down substrate 200, blue phase liquid crystals 300, at least one pixel electrode 500, auxiliary mats 600, insulation layers 700, and at least one lead electrode 800.

The down substrate 200 is opposite to the up substrate 100. The down substrate 200 includes a plurality of insulation layers 700. Each of the insulation layers 700 is configured as hollow-wave-shaped with respect to the up substrate 100 and the down substrate 200. The blue phase liquid crystals 300 are filled between two lateral sides of the insulation layer 700. Each of the peaks and valleys of the wave-structure insulation layers 700 are respectively configured with a common electrode 400 and a pixel electrode 500. A slant electrical field is generated between the pixel electrode 500 and the common electrode 400. The up and down surfaces of the adjacent pixel electrode 500 and the common electrode 400 generate two electrical fields at the same time to drive the blue phase liquid crystals 300 such that the driving voltage of the blue phase liquid crystals 300 is reduced.

The common electrode 400 and the pixel electrode 500 are embedded within the insulation layer 700. In the embodiment, the insulation layer 700 is saw-tooth-shaped. The down substrate 200 is configured with a reflective layer 201 to divide the down substrate 200 into the transmission area and the reflective area. The included angle "a" between a saw-tooth edge of the insulation layer 700 within the transmission area and the down substrate 200 is smaller than the included angle "b" between the saw-tooth edge of the insulation layer 700 within the reflective area and the down substrate 200. Preferably, the included angle "a" is smaller than 45 degrees, and the included angle "b" is larger than 45 degrees.

As the manufacturing process has to be conducted layer by layer, wherein one layer is below the electrode, and the other layer is above the electrode. The materials of the two insulation layers may be the same. In other words, if the materials of the two insulation layers are the same, the two insulation layers may be considered as one insulation layer, wherein the electrodes are embedded therein.

The pixel electrode 500 and the common electrode 400 are arranged alternately arranged at the valley of the V-shaped insulation layer 700 and at the peak of the inverse-V-shaped insulation layer 700. The blue phase liquid crystals 300 are filled within a space formed by the up substrate 100 and the down substrate 200. The auxiliary mats 600 are arranged between the up substrate 100 and the down substrate 200 for spacing the up substrate 100 and the down substrate 200 apart.

Referring to FIG. 1, the lead electrode 800 is configured with the insulation layer, which is the same with the common electrode 400 and the pixel electrode 500 protruding to be V-shaped. The lead electrode 800 connects the peaks of the protrusive pixel electrodes 500, and connects the pixel electrode 500 with the electrodes on the substrate via slopes at the lateral sides. The lead electrode 800 connects the peaks of the protrusive common electrodes 400, and connects the common electrodes on each of the rows or the common electrodes on the panel via the common electrodes, preferably, the common electrode arranged on the bottom. It is to be noted that the lead electrode 800 only connects to the electrodes arranged on the wave-shaped peak, which may be the pixel electrode or the common electrode. In the embodiment, the wave-shaped structure may be a protrusive-tooth-shaped, and the pixel electrode and the common electrode are of V-shaped structure.

In the embodiment, the pixel electrode may be hollow-saw-tooth-shaped structure, as shown in FIG. 3. The peak of the saw-tooth-shaped insulation layer 700 may be the common electrode 400, and the valley of the saw-tooth-shaped insulation layer 700 may be the pixel electrode 500. When the two electrodes are not applied with electrical signals, the blue phase liquid crystals 300 are in different anisotropies. As shown in FIG. 3, the blue phase liquid crystals 300 are in a disordered state. It other embodiments, the pixel electrode 500 may be arranged at the peak of the insulation layer 700, and the common electrode 400 may be arranged at the valley of the insulation layer 700.

Figure 4:
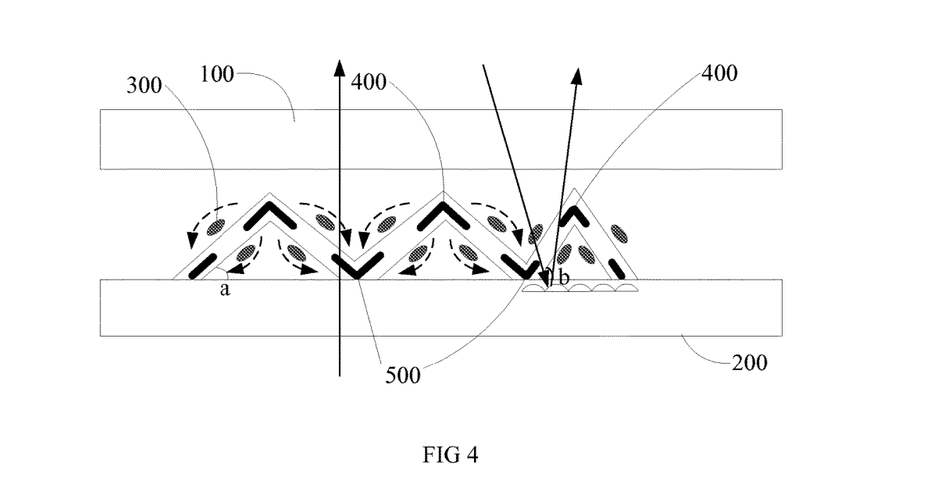
FIG. 4 is a cross-sectional view of the blue phase liquid crystal module of FIG. 3 when the electrodes are electrified.

When the common electrode 400 and the pixel electrode 500 are applied with signals, the electrical fields parallel to the internal and outer surfaces of the saw-tooth edge are generated. FIG. 4 is a cross-sectional view of the blue phase liquid crystal module of FIG. 3 when the electrodes are electrified, wherein the dashed arrows represent the formed electrical fields. The blue phase liquid crystals 300 are of optical anisotropy. The light beams may pass through the panel so as to display images.

The solid lines with arrows in FIG. 4 represent the optical transmission path. A distance for which the light beams need to pass through the transmission area is half of the distance for which the light beams enter the reflective area and are reflected out from the reflective area. In the embodiment, the ripple of the insulation layer of the transmission area and the reflective area may include different angles. That is, by configuring the included angle "a" and "b", different weights of the horizontal electrical field are generated. As such, the weight of the horizontal optical anisotropy of the blue phase liquid crystals in the transmission area is larger than that of the reflective area. Specifically, the phase delay amount of the blue phase liquid crystals in the transmission area is twice as that of the blue phase liquid crystals in the reflective area. This ensures that the optical delay of light beams passing through the blue phase liquid crystal module from the transmission area is the same with that of the light beams passing through the blue phase liquid crystal module twice from the reflective area.

In order to maintain the optical and electrical attributes of the reflective area and the transmission area, different testing panels may be manufactured in accordance with predetermined D1, D2, a, b. In addition, the testing panels are filled with the blue phase liquid crystals. The curves V-T (Voltage-Transmission rate) of the transmission area and the reflective area of the testing panels may be drown. If the curve characteristics of the transmission area and the reflective area of one testing panel are within margins of errors, the phase delay amount of the light beams passing through the transmission area is approximately twice as that of the light beams passing through the reflective area. As such, the corresponding parameters and the ratio of the structure of the testing panel may be referenced in mass production. In this way, the optical delay amount of the transmission area and the reflective area are the same.

Referring to FIG. 3, the distance between the common electrode 400 on the peak of the protrusive insulation layer 700 and the up substrate 100 is D1, and the distance between the auxiliary mats 600 (Sub PS) and the down substrate 200 is D2, wherein D1 is larger than D2. In this way, when the blue phase liquid crystal module is pressed, as the auxiliary mats 600 supports the up substrate 100, and thus the protrusive common electrode 400 is prevented from being damaged. In addition, the distance D2 may be the distance between the auxiliary mats 600 and the up substrate 100. Similarly, D1 is larger than or equals to D2.

It is to be noted that, in order to reduce the driving voltage of the blue phase liquid crystals to the greatest extent and to engage the electrode structure with the dimension of the pixels, the gap D0 between the pixel electrode 500 and the common electrode 400, the distance D1 between the common electrode 400 and the facing substrate, the included angle "a" between the insulation layer 700 and the up substrate 100 or the down substrate 200.

It can be understood that the wave-shaped structure of the insulation layer is not limited to the saw-tooth shaped. That is, the wave-shaped structure of the insulation layer may be arc-shaped, trapezium-shaped, non-isosceles triangles, or other structure. The only requirement is that the structure includes both protrusions and recesses spaced apart from each other.

Correspondingly, the common electrode 400 and the pixel electrode 500 are formed on the surfaces of the insulation layer 700, and thus the shapes of the common electrode 400 and the pixel electrode 500 may adapt to the surfaces of the insulation layer 700. In the embodiment, the common electrode 400 and the pixel electrode 500 may be V-shaped or inverse-V-shaped. In one example, when the wave-shaped structure of the insulation layer is arc-shaped, the shapes of the common electrode 400 and the pixel electrode 500 may be arc-shaped.

It can be also understood that the insulation layer 700 may not be strip-like, and may be of other shapes, as long as the gap D0 is configured, and the shape of the insulation layer 700 will be omitted hereinafter. The functions of the D0 are described below. (1) When the panel is assembled, the blue phase liquid crystals 300 may enter the internal of the hollow-protrusive insulation layer 700, that is, the gap between the blue phase liquid crystals 300 and the common electrode 400. (2) When the photoresist within the hollow-protrusive insulation layer 700, the gap D0 may be the channel for removing the material.

It can be also understood that the arrangement of the insulation layer 700 may be different from the arrangement, i.e., parallel to the orientation of the pixel. That is, the arrangement of the insulation layer 700 may be configured in accordance with real scenarios. For instance, the strip-like insulation layer 700 may form a 45-degrees angle with respect to the orientation of the pixel. Alternatively, the arrangement of the insulation layer 700 may be parallel to the edge along the vertical direction.

Figure 5:
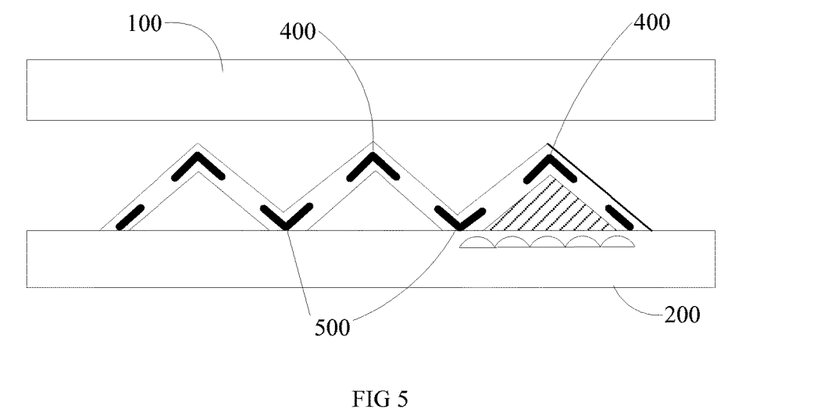
FIG. 5 is a cross-sectional view of the blue phase liquid crystal module in accordance with a second embodiment.

FIG. 5 is a cross-sectional view of the blue phase liquid crystal module in accordance with a second embodiment. The difference between the second embodiment and the first embodiment resides in that the bottom of the insulation layer 700 in the transmission area is of hollow structure, but the bottom of the insulation layer 700 in the reflective area is of solid structure. The transparent photoresist material arranged in the bottom of the insulation layer 700 in the reflective area will not be striped in the following manufacturing process, but remain in the bottom of the insulation layer 700 so as to fill the bottom of the insulation layer 700. In this way, the amount of the blue phase liquid crystals filled in the reflective area and the transmission area are different.

In addition, in the embodiment, the included angle between the saw-tooth edge of the insulation layer 700, both in the transmission area and the reflective area, and the up and down substrate are the same, preferably, in a range of 35 and 55 degrees. The phase delay amount of the transmission area is configured to be as twice as that of the reflective area by configuring the thickness of the blue phase liquid crystals in the transmission area and the reflective area. In addition, the included angle between the transmission area/reflective area and the substrates may be configured accordingly to adjust the phase delay.

Figure 6:
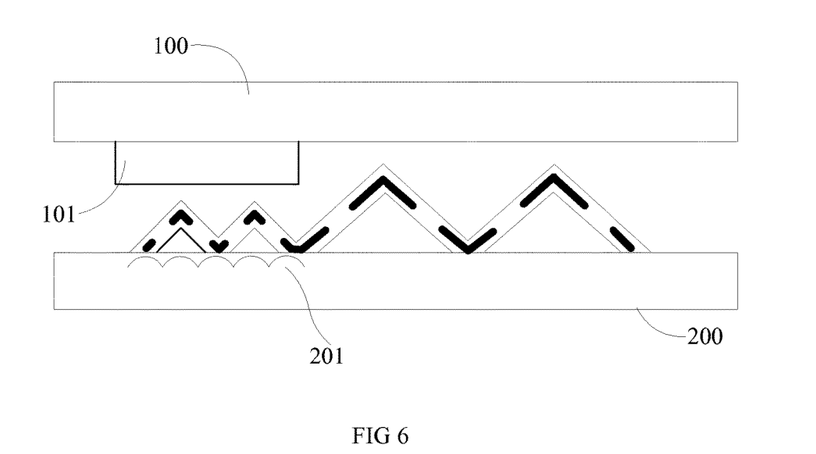
FIG. 6 is a cross-sectional view of the blue phase liquid crystal module in accordance with a third embodiment.

FIG. 6 is a cross-sectional view of the blue phase liquid crystal module in accordance with a third embodiment. In the embodiment, the height of the insulation layer 700 in the transmission area is larger than the height of the insulation layer 700 in the reflective area such that the thicknesses of the blue phase liquid crystals in the transmission area and in the reflective area are different. In this way, the transmission area may own a larger phase delay, and the transmission area and the reflective area may have consistent optical characteristics.

It is to be noted that the gap between the electrodes may be the same or may be similar. At the same time, in order to save the blue phase liquid crystals, a flat layer 101 may be configured on the peak of the insulation layer 700 having the smaller height. The flat layer 101 may operates as stuffing, and is made by transparent materials.

Figure 7:
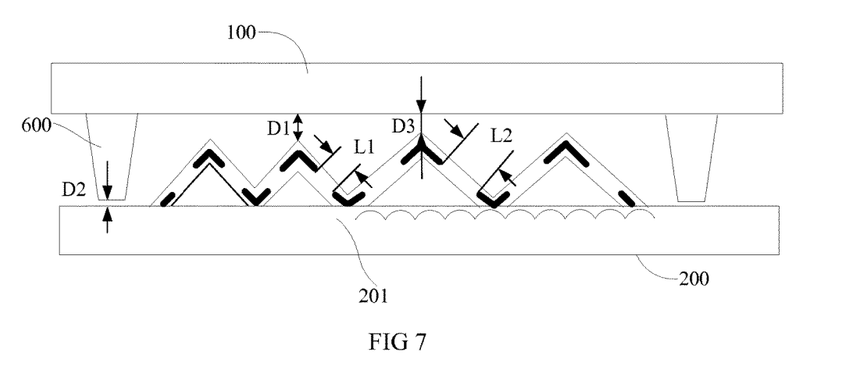
FIG. 7 is a cross-sectional view of the blue phase liquid crystal module in accordance with a fourth embodiment.

In the third embodiment, the height of the insulation layer 700 in the transmission area is larger than the height of the insulation layer 700 in the reflective area. In the fourth embodiment, the height of the insulation layer 700 in the transmission area is smaller than or equals to the height of the insulation layer 700 in the reflective area. As shown in FIG. 7, the electrode gap L1 in the transmission area is smaller than the electrode gap L2 in the reflective area. When the same voltage is applied to the transmission area and the reflective area, the optical anisotropy of the blue phase liquid crystals in the transmission area is larger than that of the reflective area. By configuring the width of the L1/L2, the phase delay of the transmission area is as twice as that in the reflective area such that the transmission area and the reflective area own the same optical characteristics. In real scenario, the aperture rate of the liquid crystal panel has to be considered upon selection the width of L1. In other words, L1 has to be above a certain value such that the light transmission rate may be maintained.

FIG. 7 is a cross-sectional view of the blue phase liquid crystal module in accordance with a fourth embodiment. The transmission area and the reflective area are spaced apart from the up substrate 100 respectively for the gap D1 and D3, wherein D1 and D3 are larger than the gap D2 between the auxiliary mats and the up substrate or the down substrate. In this way, when the blue phase liquid crystal module is pressed, as the auxiliary mats abuts against the up substrate or the down substrate, the protrusive common electrode or the pixel electrode are protected.

Figure 8:
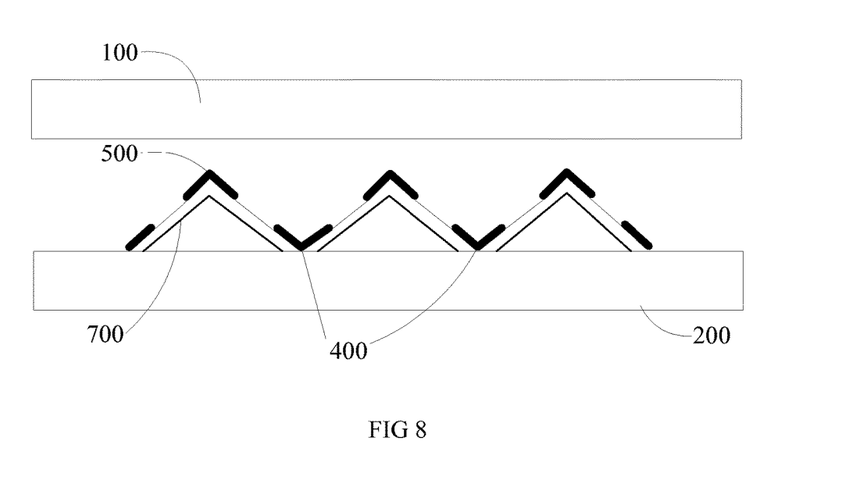
FIG. 8 is a schematic view of the blue phase liquid crystal module of FIG. 3, wherein only one insulation layer is provided.

In the fifth embodiment, the insulation layer 700 may be of one-layer structure. FIG. 8 is a schematic view of the blue phase liquid crystal module of FIG. 3, wherein only one insulation layer is provided. In the embodiment, the insulation layer 700 is only provided below the pixel electrode 500 and the common electrode 400 to support the pixel electrode 500 and the common electrode 400.

In the above disclosure relating to the second embodiment to the fifth embodiment, the details the same with that in the first embodiment are omitted hereinafter.

Compared to the conventional technology, the blue phase liquid crystal module is configured with the hollow or solid insulation layer having the down substrate as the bottom. In addition, the V-shaped or inverse-V-shaped pixel electrode and common electrode may be embedded within the insulation layer. The blue phase liquid crystals are driven by the slant electrical field formed between the V-shaped and the inverse-V-shaped pixel electrode and the common electrode so as to reduce the driving voltage of the blue phase liquid crystal module. At the same time, the issue of not being able to obtain the bright state of the liquid crystal panel when the vertical electrical field is adopted may be solved. In addition, the reflective layer is arranged in a portion of the down substrate such that the down substrate is divided into the transmission area and the reflective area. The ripple of the insulation layers of the transmission area and the reflective area may include different angles and different height. The phase delay amount of the light beams passing through the transmission area is approximately twice as that of the light beams passing through the reflective area. In this way, the optical delay amount of the transmission area and the reflective area are the same.

In addition, a blue phase LCD includes the blue phase liquid crystal module. The blue phase LCD includes structural components, such as a housing and a control circuit, and thus other components are omitted hereinafter.

Figure 9:
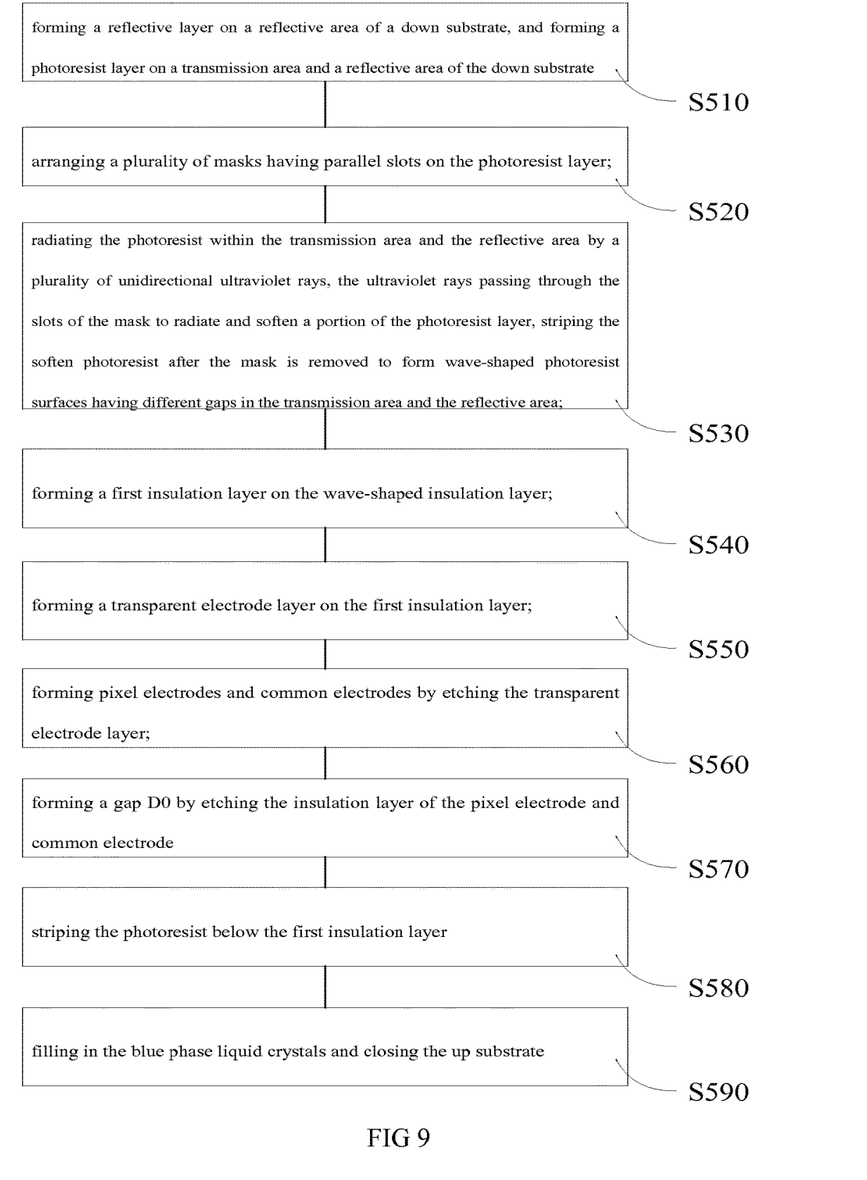
FIG. 9 is a flowchart of the manufacturing method of the blue phase liquid crystal module in accordance with one embodiment.

FIG. 9 is a flowchart of the manufacturing method of the blue phase liquid crystal module in accordance with one embodiment. The blue phase liquid crystal module in the first embodiment will be taken as one example to illustrate the manufacturing method. The blue phase liquid crystal module in other embodiments may be slightly different from that in the first embodiment, and will be explained in hereinafter.

It can be understood that the wave-shaped structure of the insulation layer is not limited to the saw-tooth shaped. That is, the wave-shaped structure of the insulation layer may be wave-shaped, wedge-shaped, or arc-shaped. In addition, the embodiment will be described by referencing the structure of blue phase liquid crystal module in the embodiment.

In block S510, a reflective layer is formed on the reflective area in the down substrate, and a photoresist layer is formed on the transmission area and the reflective area of the down substrate at the same time.

In the block S510, applying an over-coating process toward the reflective area and the transmission area after the reflective layer is formed. Afterward, the photoresist layer is formed. The transparent resin may be the material adopted in the over coat process.

In the block S520, a plurality of masks having a plurality of parallel slots are arranged on the photoresist layer.

Figure 10:
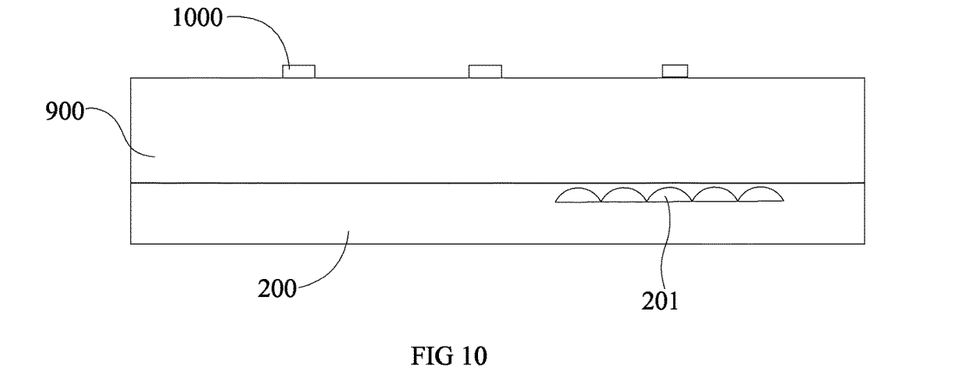
FIG. 10 is a schematic view of the reflective layer, a photoresist layer, and a mask formed by the manufacturing method of FIG. 9.

FIG. 10 is a schematic view of the reflective layer, a photoresist layer, and a mask formed by the manufacturing method of FIG. 9. The reference numeral 200 relates to the down substrate, the reference numeral 900 relates to the photoresist layer, the reference numeral 1000 relates to the mask, and the reference numeral 201 relates to the reflective layer.

In block S530, within the transmission area and the reflective area, a plurality of unidirectional ultraviolet rays radiate the photoresist layer via the slots of the masks with different slant angles so as to soften a portion of the photoresist layer. In this way, after the masks are removed, and the softened photoresist layer are removed to generate the wave-shaped photoresist surfaces having different gaps in the transmission area and the reflective area.

Figure 11:
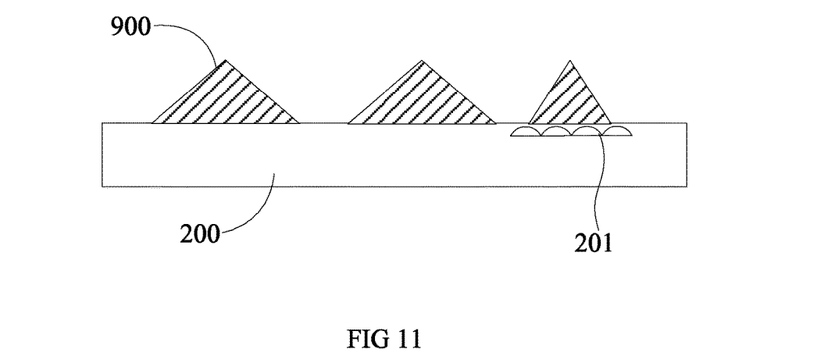
FIG. 11 is a schematic view of the wave-surface of the photoresist layer formed by the manufacturing method of FIG. 9.
Figure 12:
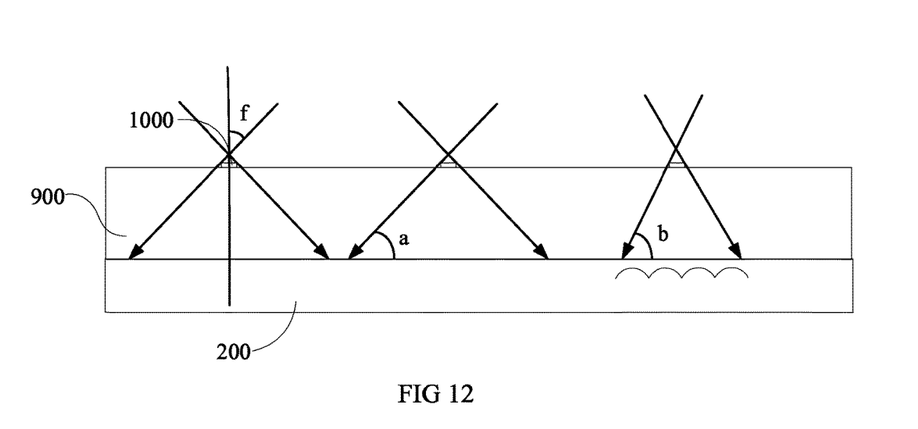
FIG. 12 is a schematic view of the configuration of the photoresist layer and the mask formed by the manufacturing method of FIG. 9, and the light diagram.

FIG. 11 is a schematic view of the wave-surface of the photoresist layer formed by the manufacturing method of FIG. 9. In this step, the unidirectional ultraviolet lamp may be rotated so as to change the radiating angle, as shown in FIG. 12. FIG. 12 is a schematic view of the configuration of the photoresist layer and the mask formed by the manufacturing method of FIG. 9, and the light diagram.

In the embodiment, the radiating angle of the unidirectional ultraviolet lamp and the vertical direction form an included angle "f", which is in a range of −55~0 and 0~55 degrees. A triangle area below the mask 1000, which has not been radiated, is formed as the saw-tooth portion. The photoresist in the radiated portion are soften and separated to form the wave-shaped (saw-tooth-shaped) photoresist surface. During the radiating process, the wave-shaped photoresist layers having different inclined angles and gaps are formed in the transmission area and the reflective area. Preferably, the included angle between the wave-shaped photoresist and the down substrate is larger than or equals to 45 degrees. The photoresist being separated and soften in the manner below. The developers are then formed on the soften photoresist layer, and the photoresist dissolved in the developers are flushed using the deionized water. At the same time, the unsoftened photoresist layer are also flushed together with the deionized water to form the wave-shaped (saw-tooth-shaped) photoresist surface.

It can be understood that, referring to FIGS. 5, 6, and 7, the radiating angle of the unidirectional ultraviolet rays, in FIG. 12, may be adjusted to form the photoresist layer of different heights and the same slant angle.

As shown in FIG. 5, the transparent photoresist below the insulation layer needs to be maintained, that is, the structure below the insulation layer is solid. In addition, the photoresist may be kept by adopting the mask, and then is radiated by the ultraviolet rays. The principles may be understood by persons skilled in the art, and thus are omitted hereinafter.

In block S540, the first insulation layer is formed on the wave-shaped photoresist surface.

Figure 13:
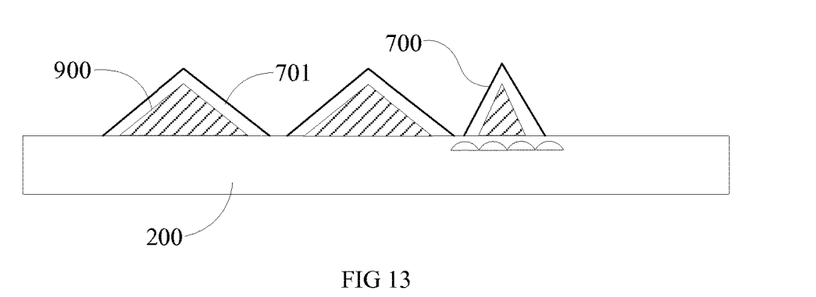
FIG. 13 is schematic view of the first insulation layer formed on the wave-surface formed by the manufacturing method of FIG. 9.

FIG. 13 is schematic view of the first insulation layer formed on the wave-surface formed by the manufacturing method of FIG. 9. The reference numeral 701 relates to the first insulation layer, which may be made by the material, such as resin, but not limited to.

In block S550, a transparent electrode layer is formed on the first insulation layer.

Figure 14:
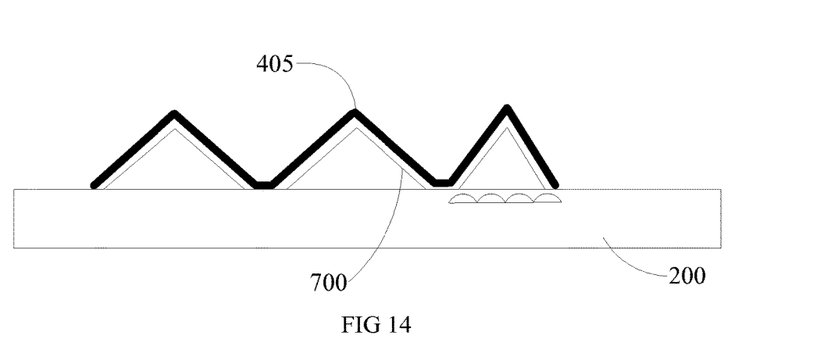
FIG. 14 is schematic view of the first insulation layer and the transparent electrode formed by the manufacturing method of FIG. 9.

FIG. 14 is schematic view of the first insulation layer and the transparent electrode formed by the manufacturing method of FIG. 9. The reference numeral 405 relates to the transparent electrode layer, and the reference numeral 701 relates to the first insulation layer.

In block S560, the pixel electrode and the common electrode are formed by etching the transparent electrode layer.

In the step, the mask having the parallel slots may be adopted to arrange the common electrodes at the V-shaped peak and the pixel electrodes at the V-shaped valley that have not been etched.

Figure 15:
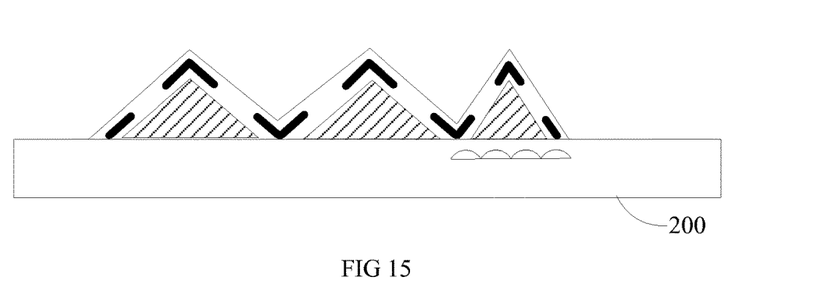
FIG. 15 is schematic view of the second insulation layer formed on the wave-surface formed by the manufacturing method of FIG. 9.

Afterward, a second insulation layer may be formed. FIG. 15 is schematic view of the second insulation layer formed on the wave-surface formed by the manufacturing method of FIG. 9. It can be understood that the second insulation layer may be optional. FIG. 8 is a schematic view of the blue phase liquid crystal module of FIG. 3, wherein only one insulation layer is provided. The materials of the two insulation layers may be the same, and thus may be viewed as one insulation layer having the electrode embedded inside. When there is one insulation layer, the insulation layer is arranged in the bottom of the electrode.

The lead electrode may be formed when the pixel electrode and the common electrode are etched. The structure of the lead electrode is shown in FIG. 1. The lead electrode may connect with the pixel electrode or the common electrode. The lead electrode 800 is configured with the insulation layer, which is the same with the V-shaped common electrode 400 and the pixel electrode 500. The lead electrode 800 connects the peaks of the protrusive pixel electrodes 500, and connects the pixel electrode 500 with the electrodes on the substrate via slopes at the lateral sides. The lead electrode 800 connects the peaks of the protrusive common electrodes 400, and connects the common electrodes on each of the rows or the common electrodes on the panel via the common electrodes, preferably, the common electrode arranged on the bottom. It is to be noted that the lead electrode 800 only connects to the electrodes arranged on the wave-shaped peak, which may be the pixel electrode or the common electrode. In the embodiment, the wave-shaped structure may be a protrusive-tooth-shaped, and the pixel electrode and the common electrode are of V-shaped structure. Preferably, the common electrode is arranged in the bottom of the protrusion. In the embodiment, the electrode gap in the transmission area and the reflective area are the same.

In block S570, the insulation layer embedded with the pixel electrode and the common electrode is etched to form a gap D0.

In block S570, the photoresist below the first insulation layer is striped.

Figure 16:
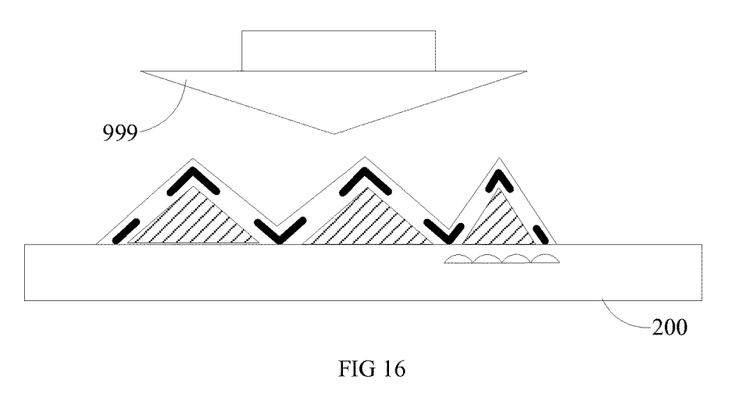
FIG. 16 is schematic view of the striped photoresist formed by the manufacturing method of FIG. 9.

In this step, the ultraviolet rays are configured to radiate the first insulation layer, and the photoresist below the first insulation layer are softened. The developers are then formed on the soften photoresist layer, and the photoresist dissolved in the developers are flushed by the deionized water. Referring to FIG. 1, D0 operates as a channel where the developers and the deionized water may flow in and out. FIG. 16 is schematic view of the striped photoresist formed by the manufacturing method of FIG. 9, wherein the reference numeral 999 relates to the ultraviolet rays.

In block S590, the blue phase liquid crystals are filled and the up substrate is closed to form the blue phase liquid crystal module in FIG. 3, and the process ends.

With respect to the manufacturing method of the blue phase liquid crystal module, the blue phase liquid crystal module is configured with the hollow or solid insulation layer having the down substrate as the bottom. In addition, the V-shaped or inverse-V-shaped pixel electrode and common electrode may be embedded within the insulation layer. The blue phase liquid crystals are driven by the slant electrical field formed between the V-shaped and the inverse-V-shaped pixel electrode and the common electrode so as to reduce the driving voltage of the blue phase liquid crystal module. At the same time, the issue of not being able to obtain the bright state of the liquid crystal panel when the vertical electrical field is adopted may be solved. In addition, the reflective layer is arranged in a portion of the down substrate such that the down substrate is divided into the transmission area and the reflective area. The ripple of the insulation layers of the transmission area and the reflective area may include different angles and different height. The phase delay amount of the light beams passing through the transmission area is approximately twice as that of the light beams passing through the reflective area. In this way, the optical delay amount of the transmission area and the reflective area are the same.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A blue phase liquid crystal module, comprising:
an up substrate;
a down substrate opposite to the up substrate;
blue phase liquid crystals between the up substrate and the down substrate;
the down substrate comprising at least one insulation layer having a wave-shaped structure with respect to the up substrate and the down substrate, the down substrate comprising a reflective layer to divide the down substrate into a transmission area and a reflective area, the reflective layer being arranged in a portion of the down substrate, pixel electrodes and common electrodes are arranged alternately at valleys and at peaks of the wave-shaped insulation layer, and the blue phase liquid crystals are driven by at least one slant electrical field generated between the pixel electrode and the common electrode; wherein the insulation layer is of a saw-tooth-shaped structure, the common electrode is V-shaped and is arranged at the valley of the wave-shaped insulation layer, and the pixel electrode is inverse-V-shaped and is arranged at the peak of the wave-shaped insulation layer, an included angle between a saw-tooth edge of the insulation layer within the transmission area and the down substrate is smaller than the included angle between the saw-tooth edge of the insulation layer within the reflective area and the down substrate.

2. The blue phase liquid crystal module claimed in claim 1, wherein the common electrode is inverse-V-shaped and is arranged at the peak of the wave-shaped insulation layer, and the pixel electrode is V-shaped and is arranged at the valley of the wave-shaped insulation layer.

3. The blue phase liquid crystal module claimed in claim 1, wherein a height of the saw-tooth-shaped structure in the transmission area and the height of the saw-tooth-shaped insulation layer in the reflective area are different.

4. The blue phase liquid crystal module claimed in claim 1, wherein a space between the insulation layer in the transmission area and the down substrate is of a hollow structure to receive the blue phase liquid crystals, and the space between the insulation layer in the reflective area and the down substrate is filled by solid and transparent materials.

5. The blue phase liquid crystal module claimed in claim 1, wherein the gap between the common electrode and the pixel electrode in the transmission area is different from the gap between the common electrode and the pixel electrode in the reflective area, and the gap between the common electrode and the pixel electrode in the transmission area is smaller than the gap between the common electrode and the pixel electrode in the reflective area.

6. The blue phase liquid crystal module claimed in claim 1, wherein a gap between the pixel electrode and the common electrode in the transmission area is smaller than the gap between the pixel electrode and the common electrode in the reflective area.

7. The blue phase liquid crystal module claimed in claim 1, wherein the blue phase liquid crystal module further comprises auxiliary mats between the up substrate and the down substrate, the pixel electrode and the common electrode are respectively embedded within the insulation layer or on a surface of the insulation layer, a distance between the peak of the wave-shaped insulation layer and the up substrate is D1, the distance between the auxiliary mats and the up substrate or the down substrate is D2, wherein D1 is larger than or equals to D2.

8. A blue phase liquid crystal device (LCD), comprising:
a blue phase liquid crystal module comprising an up substrate, a down substrate opposite to the up substrate, and blue phase liquid crystals between the up substrate and the down substrate;
the down substrate comprising at least one insulation layer having a wave-shaped structure with respect to the up substrate and the down substrate, the down substrate comprising a reflective layer to divide the down substrate into a transmission area and a reflective area, the reflective layer being arranged in a portion of the down substrate, pixel electrodes and common electrodes are arranged alternately at valleys and at peaks of the wave-shaped insulation layer, and the blue phase liquid crystals are driven by at least one slant electrical field generated between the pixel electrode and the common electrode; and
wherein the insulation layer is of a saw-tooth-shaped structure, the common electrode is V-shaped and is arranged at the valley of the wave-shaped insulation layer, and the pixel electrode is inverse-V-shaped and is arranged at the peak of the wave-shaped insulation layer; an included angle between a saw-tooth edge of the insulation layer within the transmission area and the down substrate is smaller than the included angle between the saw-tooth edge of the insulation layer within the reflective area and the down substrate.

9. The blue phase LCD claimed in claim 8, wherein the common electrode is inverse-V-shaped and is arranged at the peak of the wave-shaped insulation layer, and the pixel electrode is V-shaped and is arranged at the valley of the wave-shaped insulation layer.

10. The blue phase LCD claimed in claim 8, wherein a height of the saw-tooth-shaped structure in the transmission area and the height of the saw-tooth-shaped insulation layer in the reflective area are different.

11. The blue phase LCD claimed in claim 8, wherein a space between the insulation layer in the transmission area and the down substrate is of a hollow structure to receive the blue phase liquid crystals, and the space between the insulation layer in the reflective area and the down substrate is filled by solid and transparent materials.

12. The blue phase LCD claimed in claim 8, wherein the gap between the common electrode and the pixel electrode in the transmission area is different from the gap between the common electrode and the pixel electrode in the reflective area, and the gap between the common electrode and the pixel electrode in the transmission area is smaller than the gap between the common electrode and the pixel electrode in the reflective area.

13. The blue phase LCD claimed in claim 8 wherein a gap between the pixel electrode and the common electrode in the transmission area is smaller than the gap between the pixel electrode and the common electrode in the reflective area.

14. The blue phase LCD claimed in claim 8, wherein the blue phase liquid crystal module further comprises auxiliary mats between the up substrate and the down substrate, the pixel electrode and the common electrode are respectively embedded within the insulation layer or on a surface of the insulation layer, a distance between the peak of the wave-shaped insulation layer and the up substrate is D1, the distance between the auxiliary mats and the up substrate or the down substrate is D2, wherein D1 is larger than or equals to D2.

* * * * *